Patented Feb. 6, 1923.

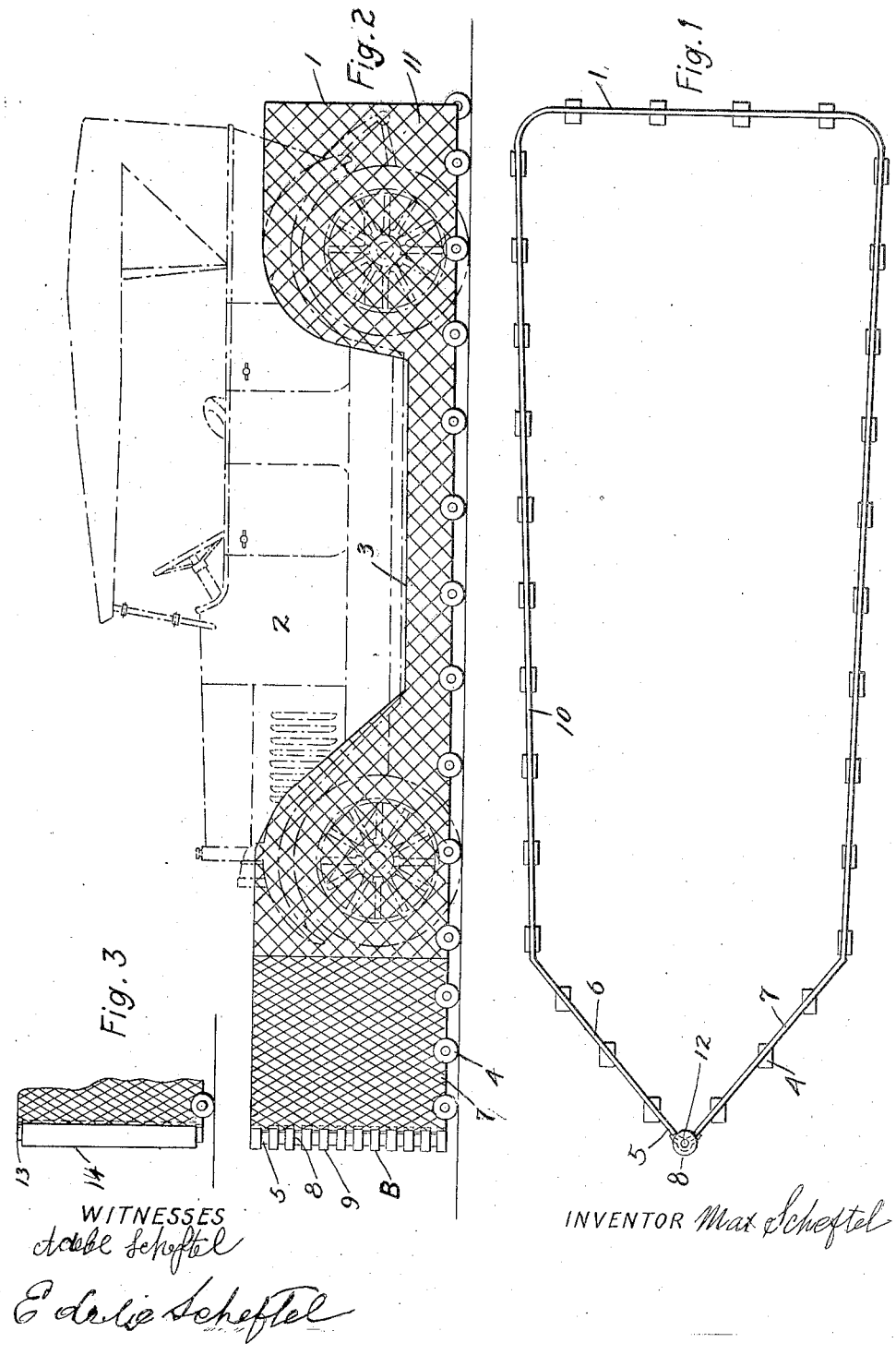

1,444,558

UNITED STATES PATENT OFFICE.

MAX SCHEFTEL, OF NEW YORK, N. Y.

AUTOMOBILE FENDER.

Application filed December 24, 1921. Serial No. 524,796.

*To all whom it may concern:*

Be it known that I, MAX SCHEFTEL, a citizen of the United States, residing at New York, in the county of New York and State of New York, have invented certain new and useful Improvements in Automobile Fenders, of which the following is a specification.

This invention relates to improvements in fenders for vehicles and has for its object to provide a cage fender for surrounding an automobile.

Another object of the invention is to provide a fender so formed as to ward off any object which the fender may hit.

A further object of the invention is to provide a fender arranged to completely enclose the wheels and running gear of the automobile.

With the above and other objects in view I have invented the device illustrated in the accompanying drawings, in which—

Figure 1, is a top plan view of my improved fender;

Figure 2, is a side elevational view thereof; showing an automobile in dotted lines enclosed therein; and Figure 3, is a fragmental front end view of a fender showing a modification.

Like reference characters indicate like parts throughout the following specification and in the several views in the drawings, in which 1 indicates a fender in the form of a cage and adapted to entirely enclose an automobile as indicated at 2, in dotted lines of Figure 2. The sides of the cage 1, are cut away to conform to the contour of the mud guards and running board of the automobile 2, so as to provide a relatively large open space 3, at the sides of the fender, whereby the doors of the car may be readily opened and access may be easily had thereto. The cage 1, is mounted upon a series of rollers 4, which extend, suitably spaced apart, entirely around the fender and upon which the same is mounted. The front end 5, of the fender is provided with vertically disposed side walls 6 and 7, inclining to a centrally disposed apex portion 8, at which terminal a series of vertically disposed rollers 9, are arranged, the purpose of which is to direct an object struck by the machine either to one or the other side of the automobile. The cage 1, is formed of a frame of steel 10, to which is fixed preferably a heavy wire netting 11. The side walls 6 and 7 of the front may be formed of a more flexible material than wire netting, such as rope or rubber composition. The rollers 9, are mounted upon a vertical rod 12, carried by said frame 10.

A fender or guard of the character above described will prevent loss of life, and injuries in automobile accidents as well as avoid injury to the car using the fender. The fender may be readily raised in order to get under the car for repairs or it may be made in several sections connected together in order that any section may be moved out of the way.

In Figure 3, a slight modification is shown in which the apex of the wedge shaped portion 13, of the fender is provided with a single vertically disposed roller 14, which extends the full depth of the fender. This roller may be of rubber or other suitable composition.

Having described my invention that which I claim to be new and desire to procure by Letters Patent is:

1. In combination with an automobile, a fender in the form of a cage completely surrounding the same, the sides of said cage being cut away;

2. In combination with an automobile, a fender in the form of a cage completely surrounding the same, the sides of said cage being cut away, the front end of said fender being wedge shaped;

3. In combination with an automobile, a fender in the form of a cage completely surrounding the same, the sides of said cage being cut away, the front end of said fender being wedge shaped, formed of flexible material;

4. In combination with an automobile, a fender in the form of a cage completely surrounding the same, the sides of said cage being cut away, the front end of said fender being wedge shaped, formed of flexible material, and terminating in rollers;

5. In combination with an automobile, a fender in the form of a cage completely surrounding the same, the sides of said cage being cut away, the front end of said fender being wedge shaped, formed of flexible material, and terminating in rollers, at the apex of said wedge;

6. In combination with an automobile, a fender in the form of a cage completely surrounding the same, the sides of said cage being cut away, the front end of said fender being wedge shaped, formed of flexible material, and terminating in rollers, at the apex of said wedge, said fender consisting of a frame and a netting mounted thereon;

7. In combination with an automobile, a fender in the form of a cage completely surrounding the same, the sides of said cage being cut away, the front end of said fender being wedge shaped, formed of flexible material, and terminating in rollers, at the apex of said wedge, said fender consisting of a frame and a netting mounted thereon, a series of wheels upon which said frame is mounted;

8. In combination with an automobile, a fender in the form of a cage completely surrounding the same, the sides of said cage being cut away, the front end of said fender being wedge shaped, formed of flexible material, and terminating in rollers, at the apex of said wedge, said fender consisting of a frame and a netting mounted thereon, a series of wheels upon which said frame is mounted, said wheels extending around all sides of said frame.

Signed at New York, in the county of Bronx and State of New York, this 23d day of December, A. D. 1921.

MAX SCHEFTEL.

Witnesses:
W. H. BROWN,
JACOB KABAH.